(12) United States Patent
Liu et al.

(10) Patent No.: US 12,681,225 B2
(45) Date of Patent: Jul. 14, 2026

(54) DISPLAY DEVICE

(71) Applicant: Wuhan China Star Optoelectronics Technology Co., Ltd., Wuhan (CN)

(72) Inventors: Guangkun Liu, Wuhan (CN); Xinpei Hu, Wuhan (CN); Huanli Yang, Wuhan (CN); Fancheng Liu, Wuhan (CN); Guowei Zha, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/521,290

(22) Filed: Nov. 28, 2023

(65) Prior Publication Data

US 2025/0052940 A1 Feb. 13, 2025

Related U.S. Application Data

(63) Continuation of application No. PCT/CN2023/114254, filed on Aug. 22, 2023.

(30) Foreign Application Priority Data

Aug. 10, 2023 (CN) .......................... 202311008433.7

(51) Int. Cl.
*F21V 8/00* (2006.01)

(52) U.S. Cl.
CPC .................................. *G02B 6/0035* (2013.01)

(58) Field of Classification Search
CPC ................................................ G02B 6/0035
See application file for complete search history.

(56) References Cited

U.S. PATENT DOCUMENTS 6,344,928 B1 * 2/2002 Honguh ................. G03B 21/60
                                                        349/95
7,784,954 B1 * 8/2010 Coleman .............. G02B 5/0278
                                                        362/558
(Continued)

FOREIGN PATENT DOCUMENTS

CN         104536069 A      4/2015
CN         105143928 A      12/2015
(Continued)

OTHER PUBLICATIONS

International Search Report in International application No. PCT/CN2023/114254, mailed on May 10, 2024.
(Continued)

*Primary Examiner* — Fatima N Farokhrooz
(74) *Attorney, Agent, or Firm* — PV IP PC; Christopher S. Ruprecht; Wei Te Chung

(57) ABSTRACT

A display device includes: a backlight module including a backlight source and a light profile adjustment film; and an optical machine module disposed on a side of the light profile adjustment film away from the backlight source. The light profile adjustment film includes an optical adjustment microstructure, and included angles between main optical axes and normal lines of light emitted from the backlight source after passing through the light profile adjustment film are centrally symmetrical with respect to a center of the light profile adjustment film. The included angle is increased or remains unchanged from the center of the light profile adjustment film to an edge of the light profile adjustment film.

5 Claims, 6 Drawing Sheets

(56) References Cited

U.S. PATENT DOCUMENTS

| | | | | |
|---|---|---|---|---|
| 8,648,771 B2 * | 2/2014 | Hwu | ................. | G02B 27/0972 |
| | | | | 345/1.3 |
| 2005/0180145 A1 * | 8/2005 | Okuwaki | ............. | G02B 6/0051 |
| | | | | 362/336 |
| 2010/0253591 A1 * | 10/2010 | Hwu | ...................... | G02B 27/40 |
| | | | | 345/1.3 |
| 2014/0286044 A1 * | 9/2014 | Johnson | ............... | G02B 5/0278 |
| | | | | 362/330 |
| 2019/0212560 A1 * | 7/2019 | Sugiyama | ............. | B60K 35/23 |
| 2020/0225402 A1 * | 7/2020 | Ihas | ..................... | G02B 6/0046 |

FOREIGN PATENT DOCUMENTS

| | | | | | |
|---|---|---|---|---|---|
| CN | 106680927 A | | 5/2017 | | |
| CN | 111381371 A | | 7/2020 | | |
| CN | 210954396 U | | 7/2020 | | |
| CN | 110268318 B | * | 8/2021 | .......... | F21V 23/0442 |
| CN | 114280793 A | | 4/2022 | | |
| CN | 115256763 A | * | 11/2022 | ............. | B29C 43/24 |
| CN | 218099682 U | | 12/2022 | | |
| CN | 116184700 A | | 5/2023 | | |
| CN | 116193904 A | | 5/2023 | | |
| JP | H10170860 A | | 6/1998 | | |
| JP | 2006202659 A | * | 8/2006 | ........... | G02B 6/0061 |
| JP | 2019219532 A | * | 12/2019 | ........... | G02B 5/0236 |
| TW | M575878 U | | 3/2019 | | |
| TW | 1730657 B | * | 6/2021 | | |
| WO | WO-2005083475 A1 | * | 9/2005 | ............. | B32B 27/18 |

OTHER PUBLICATIONS

Written Opinion of the International Search Authority in International application No. PCT/CN2023/114254, mailed on May 10, 2024.

Chinese Office Action issued in corresponding Chinese Patent Application No. 202311008433.7 dated Jul. 16, 2025, pp. 1-9.

* cited by examiner

DISPLAY DEVICE

CROSS-REFERENCE TO RELATED APPLICATION

This application a continuation of International Application No. PCT/CN2023/114254, filed on Aug. 22, 2023, which claims priority to Chinese Patent Application No. 202311008433.7, filed on Aug. 10, 2023, the disclosures of which are hereby incorporated by reference in their entities.

TECHNICAL FIELD

The present disclosure relates to a display technology field, and in particular, to a display device.

BACKGROUND

In assessment of a virtual reality (VR)/augmented reality (AR) device, parameters, such as viewing angle, definition, tracking accuracy, and comfort, need to be considered in general.

For definition, three points need to be mainly considered: resolution, refresh rate, and pixels per inch (PPI). The refresh rate determines the smoothness of the picture. The delay and smearing phenomena of the device with a higher refresh rate may be greatly reduced. PPI is a core factor in determining the definition. Basically, a higher PPI indicates better definition. A high tracking accuracy and low delay make it easier to bring about a sense of immersion. As a wearable device, the VR device is difficult to be used for a long time if the overall comfort is poor, so that experience is greatly degraded. In addition to weight of the VR device, whether the VR device supports adjustment of pupil distance and object distance or usage with glasses worn as well as materials of the device are also main factors that affect comfort.

SUMMARY

Light emitted by a backlight source of an existing display device has an unsatisfactory light profile. When the display device is used in the VR field, the amount of light entering eyes when an optical machine module is used, a light utilization rate of the backlight source is low, and uniformity of the display device is poor.

An objective of the present disclosure is to provide a display device that can resolve problems, such as low light utilization efficiency of the backlight source of a conventional display device and poor uniformity of the display device.

To resolve the foregoing problems, the present disclosure provides a display device. The display device includes: a backlight module, wherein the backlight module includes a backlight source and a light profile adjustment film disposed on a light exit side of the backlight source; and an optical machine module disposed on a side of the light profile adjustment film away from the backlight source, wherein an area of the optical machine module is greater than an area of the backlight module. The light profile adjustment film includes an optical adjustment microstructure, and included angles between main optical axes and normal lines of light emitted from the backlight source after passing through the light profile adjustment film are centrally symmetrical. The light emitted from the backlight source after passing through the light profile adjustment film tends to be increased from a center of the light profile adjustment film to an edge of the light profile adjustment film. Alternatively, the included angle A between the main optical axis and the normal line of the light emitted from the backlight source after passing through the light profile adjustment film remains unchanged from the center of the light profile adjustment film to the edge of the light profile adjustment film.

Furthermore, the included angle between the main optical axis and the normal line of the light emitted from the backlight source after passing through the light profile adjustment film tends to be increased from 0° to 10° from the center of the light profile adjustment film to the edge of the light profile adjustment film, and a cone of the light emitted from the backlight source after passing through the light profile adjustment film ranges from 10° to 13°.

Furthermore, the backlight source is a collimated backlight source, and the optical adjustment microstructure is an optical expansion structure.

Furthermore, the light profile adjustment film is a Fresnel lens. A smooth surface of the Fresnel lens faces the backlight source, and a center of the Fresnel lens coincides with a center of the backlight source. A focal length of the Fresnel lens tends to be larger in directions from the center to an edge of the Fresnel lens.

Furthermore, the included angle between the main optical axis and the normal line of the light emitted from the backlight source after passing through the light profile adjustment film remains unchanged from the center of the light profile adjustment film to the edge of the light profile adjustment film, and a cone of the light emitted from the backlight source after passing through the light profile adjustment film ranges from 20° to 25°.

Furthermore, the backlight source is a collimated backlight source, and the optical adjustment microstructure is an optical expansion structure.

Furthermore, the light profile adjustment film includes a plurality of light diffuser structures arranged in a matrix. A side of each light diffuser structure close to the backlight source is a flat surface, and a side of each light diffuser structure away from the backlight source is a curved surface. The curved surface satisfies $KX^2+LY^2=Z$, wherein K and L are constants, and X, Y, and Z respectively represent variables in a first direction, a second direction perpendicular to the first direction, and a third direction perpendicular to the first direction and the second direction, and a ratio of K to L ranges from 1 to 4.

Furthermore, the light profile adjustment film is a viewing angle control film, and the viewing angle control film includes a PICASUS film.

Furthermore, the light profile adjustment film includes a first light diffuser structure and a second light diffuser structure disposed in the first light diffuser structure, and the refractive index of the first light diffuser structure is greater than the refractive index of the second light diffuser structure. A shape of projection of the second light diffuser structure on the backlight source includes one or more of a circle or an ellipse.

Furthermore, uniformity of the light emitted from the backlight source after passing through the light profile adjustment film is greater than 90%.

Furthermore, the collimated backlight source includes: a reflector; a light guide plate disposed on a side of the reflector close to the light profile adjustment film; a light source disposed on a side of the light guide plate; a light turning film disposed on a side of the light guide plate close to the light profile adjustment film; and a protection layer disposed on a side of the light turning film close to the light profile adjustment film.

Furthermore, the optical adjustment microstructure is an optical concentration structure, and the backlight source is a non-collimated backlight source. The non-collimated backlight source includes: a light source; a reflector disposed on a side of the light source away from the light profile adjustment film; a diffuser disposed on a side of the light source close to the light profile adjustment film; and a brightness enhancement film disposed on a side of the diffuser close to the light profile adjustment film. The light profile adjustment film includes a first optical concentration structure and a second optical concentration structure disposed in the first optical concentration structure, and the refractive index of the first optical concentration structure is less than the refractive index of the second optical concentration structure. A shape of projection of the second optical concentration structure on the backlight source includes one or more of a circle or an ellipse.

BRIEF DESCRIPTION OF THE DRAWINGS

To describe the technical solutions in the embodiments of the present disclosure more clearly, the accompanying drawings needed to be used in the descriptions of the embodiments are briefly introduced below. Apparently, the accompanying drawings in the following descriptions are merely some embodiments of the present disclosure. For a person skilled in the art, other accompanying drawings can also be obtained based on these accompanying drawings without creative efforts.

DETAILED DESCRIPTION

The preferred embodiments of the present disclosure are described in detail below with reference to the accompanying drawings, to completely introduce the technical content of the present disclosure to a person skilled in the art and to demonstrate by examples that the present disclosure can be implemented, making the technical content disclosed in the present disclosure clearer, and making it easier for a person skilled in the art to understand how to implement the present disclosure. However, the present disclosure can be embodied in many different forms of embodiments. The protection scope of the present disclosure is not limited to the embodiments mentioned in the specification. The following descriptions of the embodiments are not intended to limit the scope of the present disclosure.

The directional terms mentioned in the present disclosure, such as "up", "down", "front", "back", "left", "right", "inside", "outside", "side" are only directions in the accompanying drawings. The directions in the accompanying drawings and the directional terms used herein are intended to explain and illustrate the present disclosure, but are not intended to limit the protection scope of the present disclosure.

In the accompanying drawings, members with the same structure are denoted by the same numerals, and members with similar structures or functions are denoted by similar numerals. In addition, to facilitate understanding and description, a size and thickness of each member shown in the accompanying drawings are arbitrarily shown, and the present disclosure does not limit the size and thickness of each member.

Embodiment 1

Figure 2:
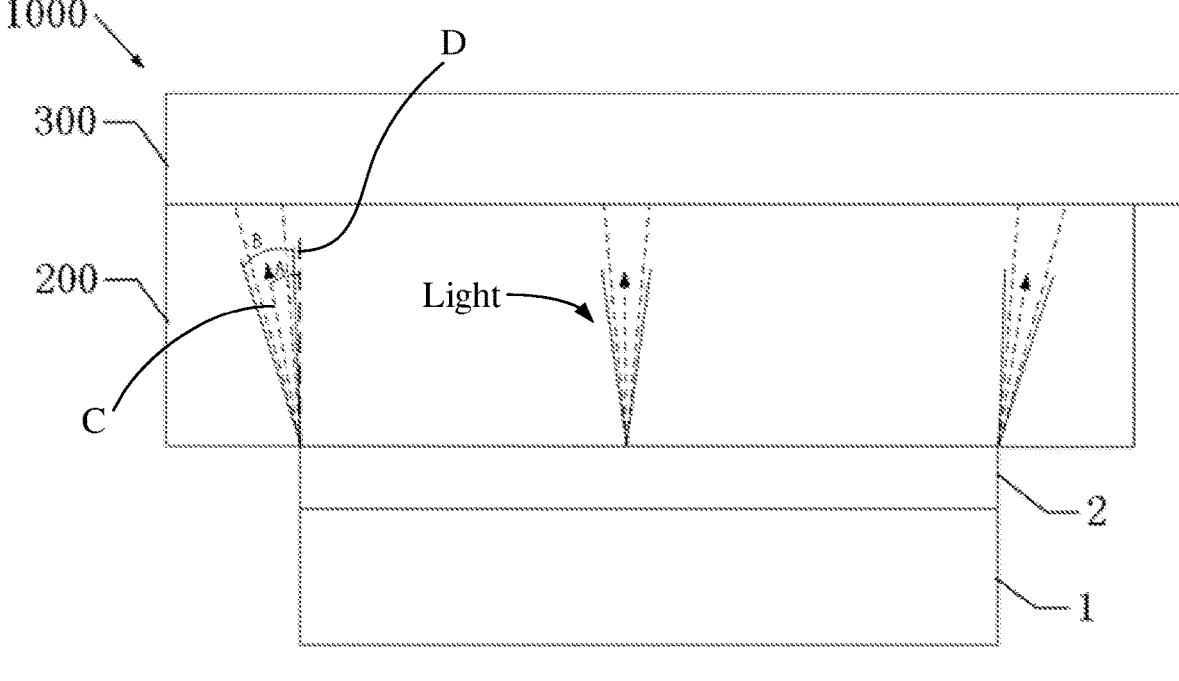
FIG. 2 is a schematic diagram of light of a display device according to the present disclosure.

As shown in FIG. 2, the present embodiment provides a display device 1000. The display device 1000 includes a backlight module 100, a display module 200 and an optical machine module 300.

The display module 200 is disposed between the backlight module 100 and the optical machine module 300. In the present embodiment, the display module 200 includes film layer structures such as a lower polarizer, an array substrate, a liquid crystal layer, a color film substrate, and an upper polarizer.

The optical machine module 300 includes a combination of a plurality of lenses. An area of the optical machine module 300 is greater than an area of the backlight module 100.

Figure 1:
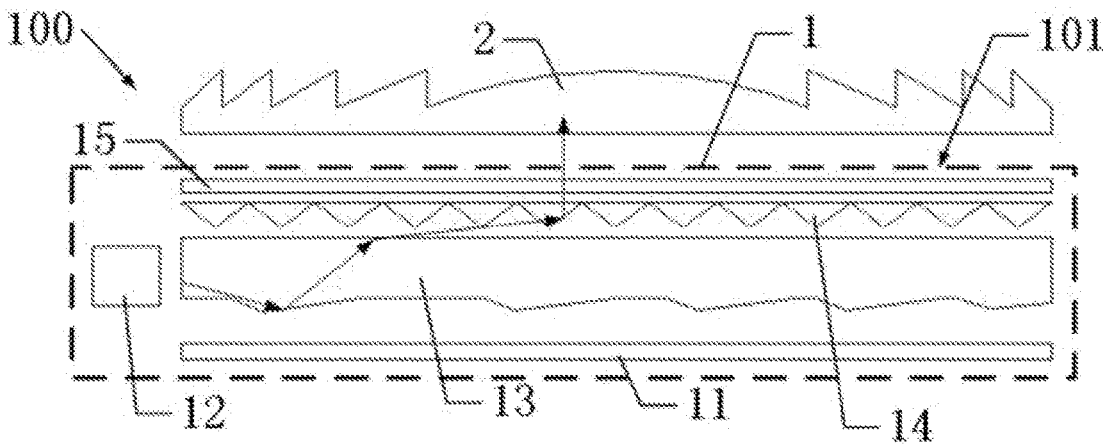
FIG. 1 is a schematic diagram of a structure of a backlight module according to an embodiment.

As shown in FIG. 1, the backlight module 100 includes a backlight source 1 and a light profile adjustment film 2.

The backlight source 1 has a light exit side 101. Specifically, the light exit side 101 of the backlight source 1 is a side of a protection layer 15 away from a reflector 11. In the present embodiment, the backlight source 1 is a collimated backlight source. The collimated backlight source includes the reflector 11, a light source 12, a light guide plate 13, a light turning film 14, and the protection layer 15. In the present embodiment, a side-type light source is used. In other embodiments, a direct-type light source may also be used.

The reflector 11 is configured to reflect light escaping from the bottom of the light guide plate 13 back into the light guide plate 13 to improve availability of light.

The light guide plate 13 is disposed on a side of the reflector 11 close to the light profile adjustment film 2. The light guide plate 13 is mainly configured to transmit light emitted by the light source 12 toward the light profile adjustment film 2.

The light source 12 is provided on at least one end of the light guide plate 13.

The light turning film 14 is disposed on a side of the light guide plate 13 close to the light profile adjustment film 2. The light emitted by the light source 12 is transmitted through the light guide plate 13 and then passes through the light turning film 14 to form collimated light perpendicular to an upper surface of the protection layer 15.

The protection layer 15 is disposed on a side of the light turning film 14 close to the light profile adjustment film 2.

The light profile adjustment film 2 is disposed on the light exit side 101 of the backlight source 1. The light profile adjustment film 2 includes an optical adjustment microstructure. In the present embodiment, the optical adjustment microstructure is an optical expansion structure.

In the present embodiment, the light profile adjustment film 2 is a Fresnel lens. A smooth surface of the Fresnel lens faces the backlight source 1, and a center of the Fresnel lens coincides with a center of the backlight source 1. A focal length of the Fresnel lens tends to be larger in directions from the center to an edge of the Fresnel lens. A diameter of the Fresnel lens is 40 mm, a tooth height of the Fresnel lens is 20 μm, a maximum tooth width of the Fresnel lens is 40 μm, a material of the Fresnel lens is PMMA, and a base thickness of the Fresnel lens is 0.1 mm.

Included angles A between main optical axes C and normal lines D of light emitted from the backlight source 1 after passing through the light profile adjustment film 2 are centrally symmetrical with respect to the center of the light profile adjustment film, and tend to be increased from the center of the light profile adjustment film to the edges of the light profile adjustment film. Alternatively, the included angle A between the main optical axis and the normal line of the light emitted from the backlight source 1 after passing through the light profile adjustment film 2 remains unchanged from the center of the light profile adjustment film to the edge of the light profile adjustment film. The main optical axis C of light emitted from the backlight source 1 refers to a central ray of point light source, that is, the optical axis refers to a center beam line of a light beam (or light column), or a symmetry axis of a optical system. When the light beam rotates around the main optical axis and there should be no change in optical characteristics. The normal lines D of light emitted from the backlight source 1 refers to a normal line of an interface where light from a point light source enters the light profile adjustment film (a direction of the normal line D is perpendicular to a plane where the backlight source is located or the light profile adjustment film.

As shown in FIG. 2, in the present embodiment, the included angles A between the main optical axes and the normal lines of the light emitted from the backlight source 1 after passing through the light profile adjustment film 2 are centrally symmetrical, and tends to be increased from the center of the light profile adjustment film to the edges of the light profile adjustment film.

Figure 3:
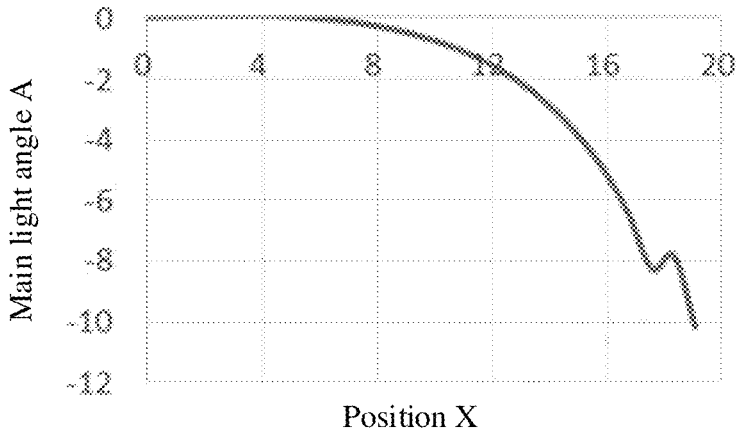
FIG. 3 is a graph of changes in an included angle between a main optical axis and a normal line of a backlight module according to an embodiment.

As shown in FIG. 3, a horizontal axis represents a distance X between a specific position and the center of the light profile adjustment film, and a vertical axis represents the included angle A between the main optical axis and the normal line of the light emitted from the backlight source 1 after passing through the light profile adjustment film 2. Specifically, the included angle A between the main optical axis and the normal line of the light emitted from the backlight source 1 after passing through the light profile adjustment film 2 tends to be increased from 0° to 10° from the center of the light profile adjustment film to the edge of the light profile adjustment film.

As shown in FIG. 2, a cone B of the light emitted from the backlight source after passing through the light profile adjustment film ranges from 10° to 13°. The cone B of the light emitted from the backlight source after passing through the light profile adjustment film in the present embodiment is 13°.

Uniformity of the light emitted from the backlight source 1 after passing through the light profile adjustment film 2 is greater than 90%.

Through experiments, brightness uniformity within a viewing angle range at a center of the optical machine module in the present embodiment is not significantly different from brightness uniformity within the viewing angle range at the center of the optical machine module without the light profile adjustment film. In the present embodiment, the light profile adjustment film 2 enables the included angles between the main optical axes and the normal lines of the light emitted from the backlight source 1 after passing through the light profile adjustment film 2 to be centrally symmetrical, and to be increased from the center of the light profile adjustment film to the edges of the light profile adjustment film. Directional backlight is achieved by shaping a backlight. A design of different main optical axis angles of emitted light at different positions of the backlight module 100 enables more light emitted by the backlight source 1 to enter a viewing angle range of the optical machine module, thereby achieving higher light utilization efficiency and better uniformity at different viewing angles, reducing power consumption, enhancing diversified performances of products, and increasing market competitiveness of the products. Through the foregoing adjustments, compared with the brightness uniformity within the viewing angle range at the edge of the optical machine module without the light profile adjustment film, the brightness uniformity within the viewing angle range at the edge of the optical machine module in the present embodiment is improved by 2 times to 3 times, and compared with a conventional display device, the overall brightness of the display device in the present embodiment is improved by 1.3 times to 3 times.

Embodiment 2

Figure 4:
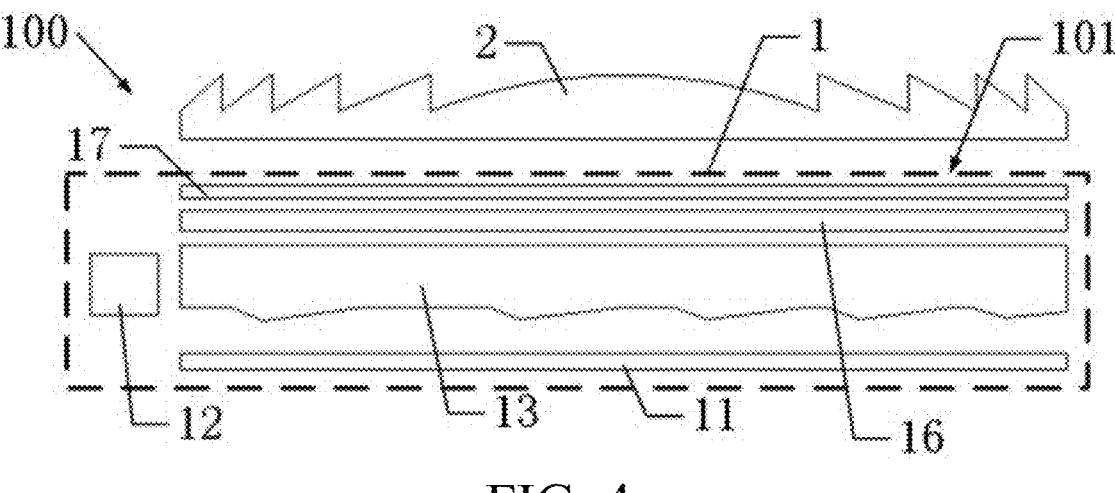
FIG. 4 is a schematic diagram of a structure of a backlight module according to an embodiment.

As shown in FIG. 4, the present embodiment includes most of the technical features of Embodiment 1. A difference between the present embodiment and Embodiment 1 is that in the present embodiment, a backlight source 1 is a non-collimated backlight source.

As shown in FIG. 4, in the present embodiment, the backlight source 1 includes a reflector 11, a light source 12, a light guide plate 13, a diffuser 16, and a brightness enhancement film 17. In the present embodiment, a side-type light source is used. In other embodiments, a direct-type light source may also be used.

As shown in FIG. 4, the reflector 11 is disposed on a side of the light source 12 away from the light profile adjustment film 2. The reflector 11 is configured to reflect light escaping from the bottom of the light guide plate 13 back into the light guide plate 13 to improve availability of light.

The diffuser 16 is disposed on a side of the light source 12 close to the light profile adjustment film 2. The diffuser 16 atomizes the light source through refraction and reflection of a diffusing material thereof, and converges the light at a small angle to the front to improve brightness of the front.

The brightness enhancement 17 is disposed on a side of the diffuser 16 close to the light profile adjustment film 2. The brightness enhancement 17 mainly plays a role in enhancing light.

Through experiments, brightness uniformity within a viewing angle range at a center of the optical machine module in the present embodiment is not significantly different from brightness uniformity within the viewing angle range at the center of the optical machine module without the light profile adjustment film. However, compared with the brightness uniformity within the viewing angle range at the edge of the optical machine module without the light profile adjustment film, the brightness uniformity within the viewing angle range at the edge of the optical machine module in the present embodiment is improved by 2 times to 3 times, and compared with a conventional display device, the overall brightness of the display device in the present embodiment is improved by 1.3 times to 3 times.

Embodiment 3

Figures 5, 6:
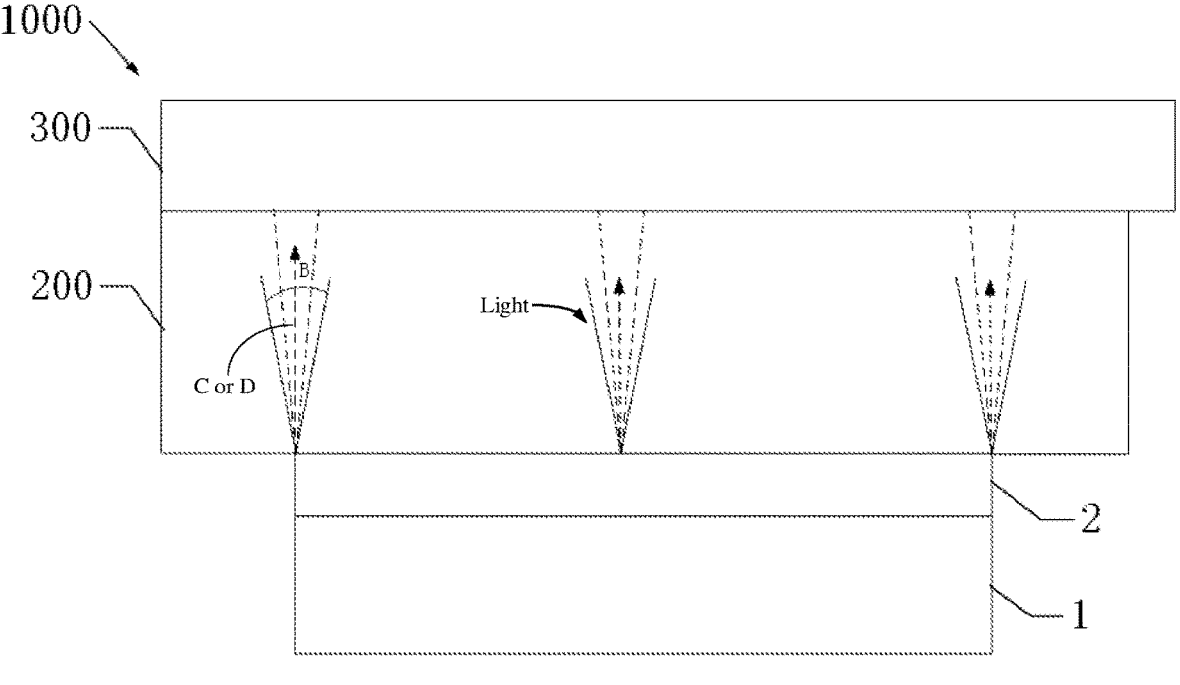
FIG. 5 is a schematic diagram of light of a display device according to an embodiment of the present disclosure.
FIG. 6 is a schematic diagram of a structure of a backlight module according to an embodiment.

As shown in FIG. 5, the present embodiment includes most of the technical features of Embodiment 1. Differences between the present embodiment and Embodiment 1 are: in the present embodiment, the included angle A (see FIG. 2) between the normal line D of the light profile adjustment film and the main optical axis C of the light emitted from the backlight source 1 after passing through the light profile adjustment film 2 remains unchanged from the center of the light profile adjustment film to the edge of the light profile adjustment film; and the cone B of the light emitted from the backlight source after passing through the light profile adjustment film ranges from 20° to 25°. In the present embodiment, the cone B of the light emitted from the backlight source after passing through the light profile adjustment film is 25°. Uniformity of the light emitted from the backlight source 1 after passing through the light profile adjustment film 2 is greater than 90%.

Figure 7:
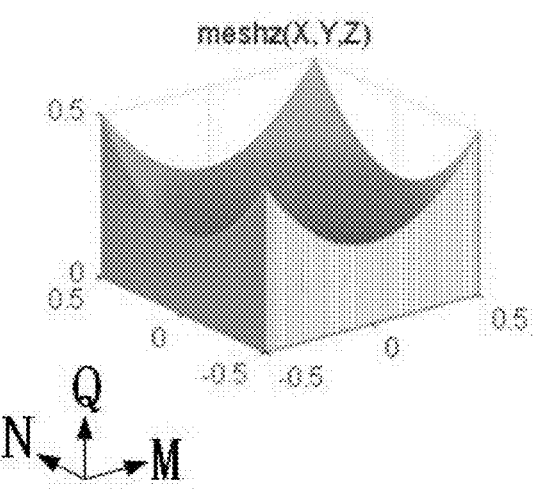
FIG. 7 is a schematic diagram of a light diffuser structure of a light profile adjustment film according to an embodiment.

As shown in FIG. 6 and FIG. 7, the light profile adjustment film 2 in the present embodiment includes a plurality of light diffuser structures 21 arranged in a matrix. A side of each light diffuser structure 21 close to the backlight source 1 is a flat surface, and a side of each light diffuser structure 21 away from the backlight source 1 is a curved surface. The curved surface is expressed as $KX^2+LY^2=Z$, where K and L are constants, and X, Y, and Z respectively represent variables in a first direction M, a second direction N perpendicular to the first direction M, and a third direction Q perpendicular to the first direction M and the second direction N. A ratio of K to L ranges from one 1 to four. If the ratio of K to L is less than 1 or greater than 4, the light in the viewing angle range of the optical machine module can be reduced, resulting in reducing light utilization rate of the backlight module. In the present embodiment, the ratio of K to L is two.

In the present embodiment, the light profile of the backlight module 100 is adjusted by the light profile adjustment film 2, so that the included angle between the main optical axis and the normal line of the light emitted from the backlight source 1 after passing through the light profile adjustment film 2 remains unchanged from the center of the light profile adjustment film to the edge of the light profile adjustment film, and the cone range of the light emitted from the backlight source after passing through the light profile adjustment film is expanded to enable more light emitted by the backlight source 1 to enter the viewing angle range of the optical machine module, thereby achieving higher light utilization efficiency and better uniformity at different viewing angles, reducing power consumption, enhancing diversified performances, and increasing market competitiveness of products. The light profile of the backlight module 100 refers to an overall profile of light from the backlight module (including multiple point light sources).

Embodiment 4

Figure 8:
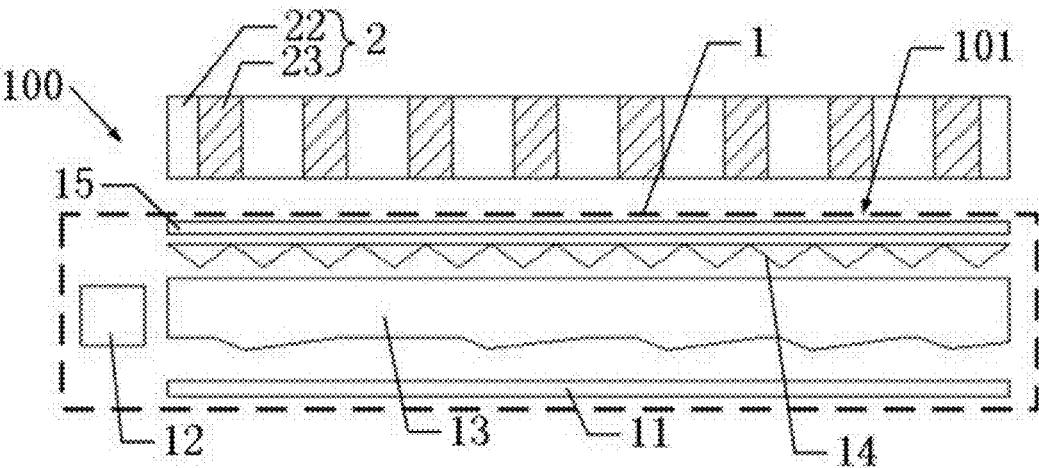
FIG. 8 is a schematic diagram of a structure of a backlight module according to an embodiment.
Figure 9:
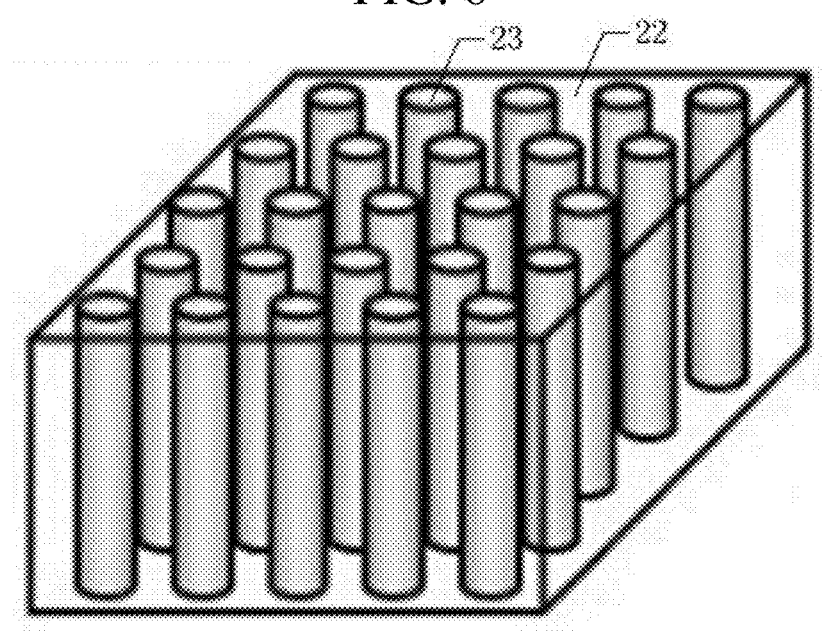
FIG. 9 is a schematic diagram of a structure of a light profile adjustment film according to an embodiment.
Figure 10:
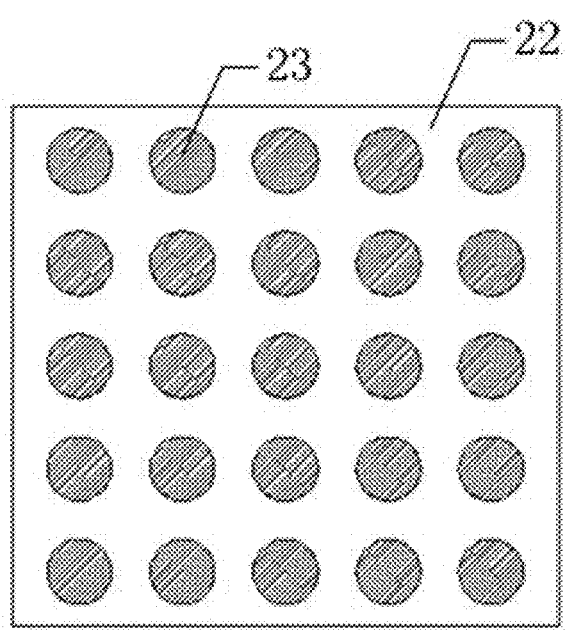
FIG. 10 is a plan view of a light profile adjustment film according to an embodiment.

As shown in FIG. 8, FIG. 9 and FIG. 10, the present embodiment includes most of the technical features of Embodiment 3. Differences between the present embodiment and Embodiment 3 are: in the present embodiment, the light profile adjustment film 2 includes a first light diffuser structure 22 and a second light diffuser structure 23 disposed in the first light diffuser structure 22; the refractive index of the first light diffuser structure 22 is greater than the refractive index of the second light diffuser structure 23.

The refractive index of the first light diffuser structure 22 ranges from 1.5 to 1.8. In the present embodiment, the refractive index of the first light diffuser structure 22 is 1.78. The refractive index of the second light diffuser structure 23 ranges from 1.1 to 1.5. In the present embodiment, the refractive index of the second light diffuser structure 23 is 1.2.

In the present embodiment, a material with the refractive index of 1.78 is used to form a film layer. The film layer is the first light diffuser structure 22, and then a material with the refractive index of 1.2 is embedded in the first light diffuser structure 22, and the material embedded in the first light diffuser structure 22 is the second light diffuser structure 23. In the present embodiment, a shape of the second light diffuser structure 23 is a cylinder. A shape of projection of the second light diffuser structure 23 on the reflector 11 is a circle. A diameter of the second light diffuser structure 23 ranges from 5 nm to 10 nm, and a spacing of the second light diffuser structure 23 ranges from 10 nm to 200 nm. In the present embodiment, the diameter of the second light diffuser structure 23 is 7 nm, and the spacing between adjacent ones of the second light diffuser structures 23 is 100 nm.

In other embodiments, the shape of the second light diffuser structure 23 may be an elliptical cylinder, and the shape of the projection of the second light diffuser structure 23 on the reflector 11 may be an ellipse.

Embodiment 5

Figure 11:
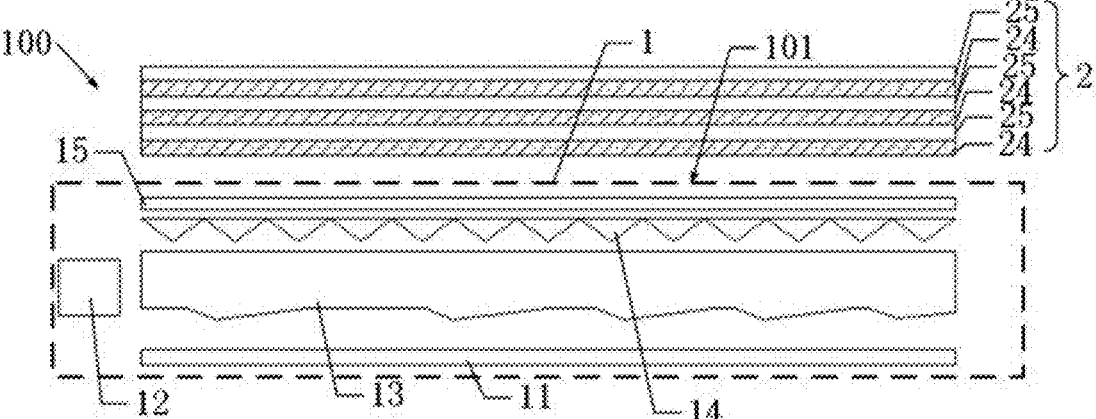
FIG. 11 is a schematic diagram of a structure of a backlight module according to an embodiment.

As shown in FIG. 11, the present embodiment includes most of the technical features of Embodiment 3. A difference between the present embodiment and Embodiment 3 is that in the present embodiment, the light profile adjustment film 2 is a viewing angle control film, and the viewing angle control film includes a PICASUS film. An embodiment of the present application uses the PICASUS film of the Tongli Company of Japan, and the PICASUS film is nanometer multilayer laminated film.

Specifically, the PICASUS film includes a first control film 24 and a second control film 25 that are alternately stacked and have different the refractive index. The first control film 24 and the second control film 25 are prepared and formed using a multi-layer co-extrusion process. Materials of the first control film 24 and the second control film 25 may both be resin.

Embodiment 6

Figure 12:
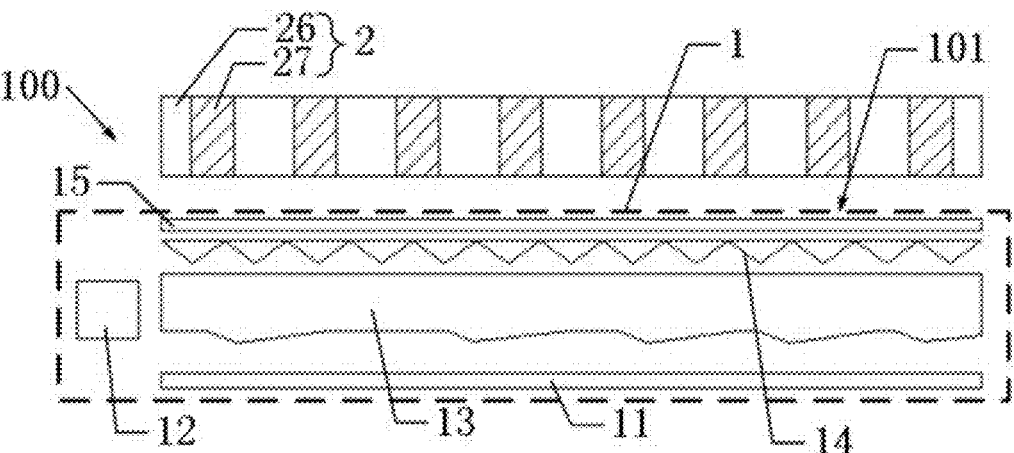
FIG. 12 is a schematic diagram of a structure of a backlight module according to an embodiment.
Figure 13:
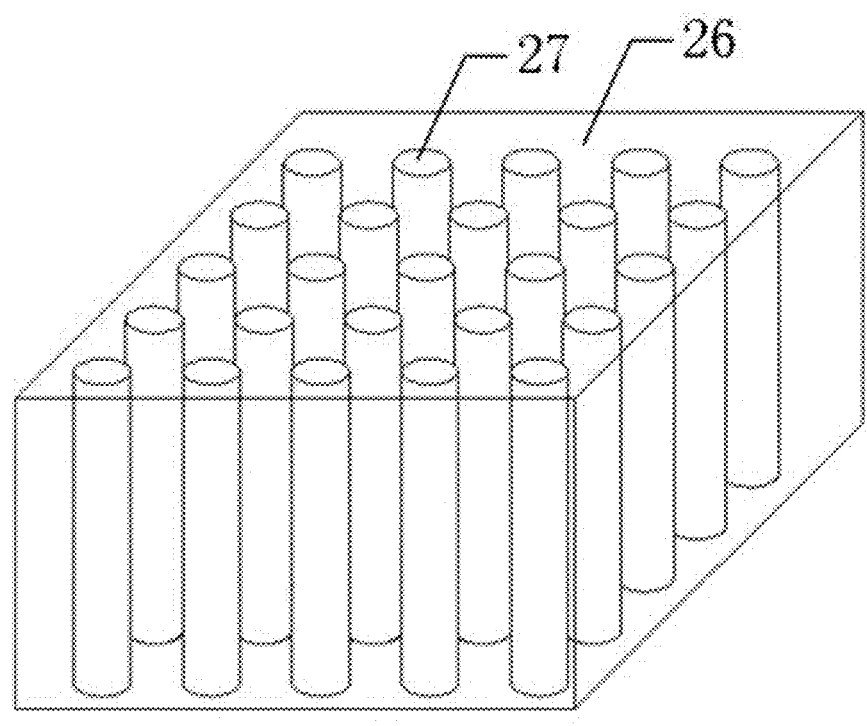
FIG. 13 is a schematic diagram of a structure of a light profile adjustment film according to an embodiment.
Figure 14:
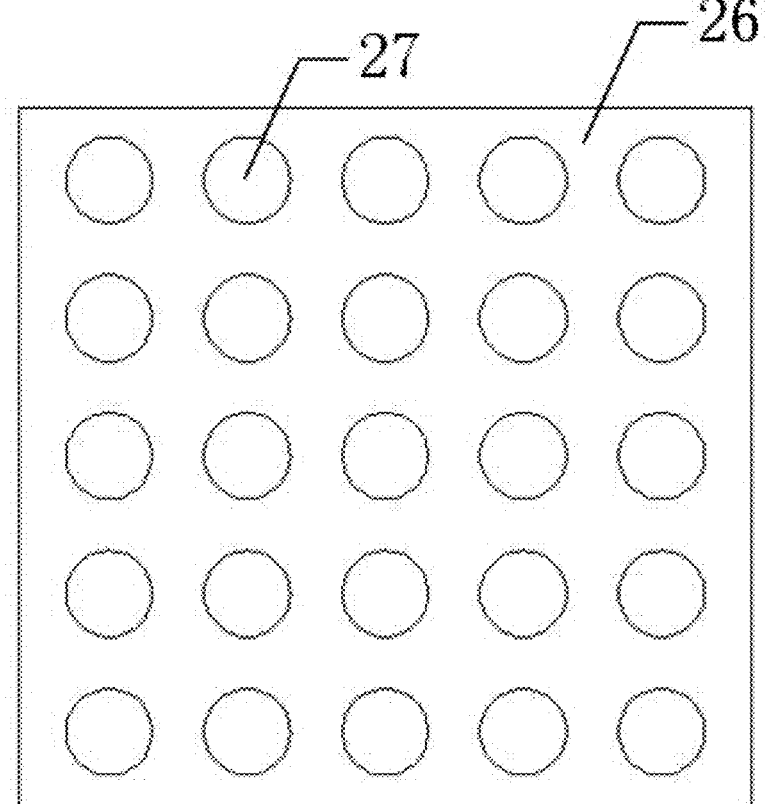
FIG. 14 is a plan diagram of a light profile adjustment film according to an embodiment.

As shown in FIG. 12, FIG. 13, and FIG. 14, the present embodiment includes most of the technical features of Embodiment 2. Differences between the present embodiment and Embodiment 2 are: in the present embodiment, the optical adjustment microstructure is an optical concentration structure, the light profile adjustment film 2 includes a first optical concentration structure 26 and a second optical concentration structure 27 disposed in the first optical concentration structure 26. The refractive index of the first optical concentration structure 26 is less than the refractive index of the second optical concentration structure 27.

The refractive index of the first optical concentration structure 26 ranges from 1.1 to 1.5. In the present embodiment, the refractive index of the first optical concentration structure 26 is 1.2. The refractive index of the second optical concentration structure 27 ranges from 1.5 to 1.8. In the present embodiment, the refractive index of the second optical concentration structure 27 is 1.78.

In the present embodiment, a material with the refractive index of 1.2 is used to form a film layer. The film layer is the first optical concentration structure 26, and then a material with the refractive index of 1.78 is embedded in the first optical concentration structure 26, and the material embedded in the first optical concentration structure 26 is used to form the second optical concentration structure 27. In the present embodiment, a shape of the second optical concentration structure 27 is a cylinder. A shape of projection of the second optical concentration structure 27 on the reflector 11 is a circle. A diameter of the second optical concentration structure 27 ranges from 5 nm to 10 nm, and a spacing of the second optical concentration structure 27 ranges from 10 nm to 200 nm. In the present embodiment, the diameter of the second optical concentration structure 27 is 7 nm, and the spacing between adjacent ones of the second optical concentration structures 27 is 100 nm.

In other embodiments, the shape of the second optical concentration structure 27 may be an elliptical cylinder, and the shape of the projection of the second optical concentration structure 27 on the reflector 11 may be an ellipse.

Furthermore, a display device according to the present disclosure is described above in detail. Although the principles and implementations of the present disclosure are described by using specific examples in this specification, the descriptions of the foregoing embodiments are merely intended to help understand the method and the core idea of the present disclosure. Meanwhile, a person skilled in the art may make modifications to the specific implementations and application range according to the idea of the present disclosure. In conclusion, the content of this specification is not construed as a limit on the present disclosure.

What is claimed is:

1. A display device, comprising:
a backlight module, wherein the backlight module comprises a backlight source and a light profile adjustment film disposed on a light exit side of the backlight source, the backlight source is a collimated backlight source, and the light profile adjustment film is configured to receive light emitted from the light exit side of the backlight source and emit beams of light respectively from positions on a surface of the light profile adjustment film away from the backlight source, wherein the backlight source comprises: a reflector disposed at a side of the backlight source away from the light profile adjustment film, a light guide plate disposed between the reflector and the light profile adjustment film, and a light turning film disposed on a side of the light guide plate close to the light profile adjustment film; and
a display module, disposed on the surface of the light profile adjustment film away from the backlight source, wherein the light profile adjustment film comprises an optical adjustment microstructure, the optical adjustment microstructure comprises a plurality of light diffuser structures arranged in a matrix, a side of each of the plurality of light diffuser structures close to the backlight source is a flat surface, a side of each of the plurality of light diffuser structures away from the backlight source is a curved surface, and the curved surface is expressed as $KX^2+LY^2=Z$, wherein K and L are constants, X, Y, and Z respectively represent variables in a first direction, a second direction perpendicular to the first direction, and a third direction perpendicular to the first direction and the second direction, and a ratio of K to L ranges from one to four;

an angle is formed by a main optical axis of each of the beams of light and a normal line of the light profile adjustment film at a corresponding one of the positions respectively, and the angle between the main optical axis and the normal line of the beams of light, after the light emitted from the backlight source passes through the light profile adjustment film, is centrally symmetrical with respect to a center of the light profile adjustment film, wherein the main optical axis refers to a center line of each of the beams, and the normal line refers to a line perpendicular to a horizontal plane at the corresponding one of the positions, and wherein the horizontal plane is parallel with the flat surface of each of the plurality of light diffuser structures; and the angle between the main optical axis and the normal line of the beams, after the light emitted from the backlight source passes through the light profile adjustment film, remains unchanged for respective ones of the beams for any position from the center of the light profile adjustment film to an edge of the light profile adjustment film, wherein a cone of each of the beams, after the light emitted from the backlight source passes through the light profile adjustment film, is within a range from 20° to 25°.

2. The display device of claim 1, wherein uniformity of the beams of light emitted from the light profile adjustment film, after the light emitted from the collimated backlight source passes through the light profile adjustment film, is greater than 90%.

3. The display device of claim 1, wherein the backlight source further comprises:
a light source disposed on a side of the light guide plate; and
a protection layer disposed on a side of the light turning film close to the light profile adjustment film.

4. The display device of claim 1, wherein the ratio of K to L is two.

5. The display device of claim 1, wherein the cone of each of the beams of light emitted from the light profile adjustment film, after the light emitted from the backlight source passes through the light profile adjustment film, has a constant value of approximately 25° at any position along the light profile adjustment film from the center of the light profile adjustment film to the edge of the light profile adjustment film.

* * * * *